United States Patent [19]
Friberg et al.

[11] 3,902,561
[45] Sept. 2, 1975

[54] DEVICE PARTICULARLY INTENDED FOR LONG-HOLE DRILLING AT DRIVING OF RAISES OR THE LIKE

[75] Inventors: Karl Herbert Friberg, Idkerberget; Bengt Ingvar Dalebjörk, Ludvika, both of Sweden

[73] Assignee: Atlas Copco Aktiebolag, Nacka, Sweden

[22] Filed: May 2, 1974

[21] Appl. No.: 466,301

[30] Foreign Application Priority Data
May 8, 1973   Sweden.............................. 73064743

[52] U.S. Cl.................... 175/52; 175/85; 214/1 PB; 214/2.5; 214/8.5 K; 221/251
[51] Int. Cl............................................. B65g 59/06
[58] Field of Search ...... 175/52, 85; 214/2.5, 8.5 K, 214/1 PB; 221/246, 251, 255, 269, 290

[56] References Cited
UNITED STATES PATENTS
3,305,107   2/1967   Deal................................ 214/2.5 X
3,800,980   4/1974   Takeuchi ..................... 214/1 PB X

*Primary Examiner*—Robert J. Spar
*Assistant Examiner*—George F. Abraham
*Attorney, Agent, or Firm*—Flynn & Frishauf

[57] ABSTRACT

For facilitating the handling of elongated elements, such as drill rods and roof bolts, the invention provides an apparatus for moving such elements from a magazine to the axis of a drill hole. The magazine comprises means for guiding upper and lower parts of the elements. The elements are sidewards slidably movable along the lower guiding means towards stop means spaced from the drill hole. The magazine furthermore comprises a pivotable guiding means for guiding the elements between said stop means and the axis of the drill hole, said pivotable guiding means being adapted to release the elements from said stop means at the pivoting thereof.

23 Claims, 14 Drawing Figures

DEVICE PARTICULARLY INTENDED FOR LONG-HOLE DRILLING AT DRIVING OF RAISES OR THE LIKE

The present invention relates to an apparatus for moving elongated elements, such as drill rods and roof bolts, from a stored position to the axis of a drill hole.

It is now possible to attain long-holes up to 50 meters with a rather good drilling accuracy. The most important moment is that so-called collaring, i.e. the impact against and first penetrating into the rock surface of the drill bit. Then the drill bit must concerning position as well as direction be carefully and firmly guided. This technique, however, can be considered as completely solved by the arrangement of guiding tubes, which are placed as a first intermediate member between the drill bit and the rock drilling machine. If the guiding tube is correctly lined up the initial direction can be maintained surprisingly far even in long holes although a common standard concerning rods and sleeves is used.

Drilling in mines is a trying activity for the machine operator. Despite a more and more mechanized handling, the work at a rock drilling machine with the appurtenant equipment becomes heavy and very rattling and the area nearest to the drilling place becomes extremely inhospitable as a result of the water which constantly flows down and the cuttings. Even if a rock drilling machine of the type in question now often is equipped with a self-acting feed arrangement, which automatically under impacts and rotation drives the drill bit into the rock and is arranged on a support, a machine cannot be left without superintendence. New rods must be put in all the time. When the drill bit after the coupling of an extension rod has penetrated another extension length a new extension rod consequently has to be brought into position. This means when using conventional equipment a procedure with a succession of manual operations.

As an example can be mentioned that the drilling work itself at an 8 hour shift with long-hole drilling goes on for about 6 hours. Of this latter time the drill penetrates the rock for about 4 hours. The difference between the 6 hour working time and the 4 hour drilling time, i.e. 2 hours, is needed for collaring, successive coupling of extension rods, adjusting to succeeding holes, etc. The time for the successive coupling of extension rods consequently dominates.

Different attempts have therefore been made in order to rationalize in particular that moment. It is here a question of attaining automation, which is simple, robust and reliable and which remains comparatively unaffected by the severe milieu (water mingled with rock dust, which constantly flows down).

In mines and tunnels it is well-known to strengthen the roof by means of roof bolts, which are inserted and secured within a hole that has been drilled. Prior art machines for setting roof bolts have been provided with a magazine for the bolts. In a previously known construction the roof bolts are arranged rectilinearly displaceably by means of movable gripping means to a position at the opening of the magazine. By means of a swingable arm the bolts can be gripped in that position and be moved to the axis of the drill hole by swinging of the arm around an axis parallel with the longitudinal axis of the bolts. Then the bolts are mechanically inserted into the hole and secured.

SUMMARY OF THE INVENTION

It is an object of the invention to solve the above-mentioned problem at long-hole drilling. According to one embodiment of the invention, a number of extension rods great enough for a normal long-hole drilling with coupling sleeves put on at the one end are arranged side by side close to each other in one and the same plane, which is coincident with the centre plane of the drill hole. The row of extension rods stored in that way is so arranged that a drilling rod being in turn to be fed out is held in such a position quite close to the final position for coupling between the drilling machine and the next preceding extension rod that it falls down into that final position by its own weight. In the stored position the extension rods are guided at their ends with the coupling sleeve by a groove and at their upper ends by two bars. The release of the extension rod which is in turn to be coupled is carried out by means of a pivotable guiding groove in connection with the first-mentioned groove, whereat a yoke brings the upper end of the extension rod into the right position.

A pneumatic system with valves and air cylinders adjusts the guiding groove and attains the necessary retention of the drill string at the attachment of the additional extension rod. The pneumatic system can be caused to carry out operations solely by actuation of valves arranged on the guiding means for the rock drilling machine so as to co-operate with the slide on which the drilling machine is placed. In that way no control system is required for regulating of the operation-cycle. When all the extension rods in the magazine are fed out the rock drilling machine is automatically brought to a stopping position.

It is another object of the invention to attain a simple, robust an reliable magazine for roof bolts. According to another embodiment of the invention a number of roof bolts are arranged side by side close to each other. The row of roof bolts stored in that way is so arranged that a bolt being in turn to be fed out is held in such a position quite close to the axis of the drill hole that it falls into that axis by its own weight. In the stored position the roof bolts are guided by axially spaced means. The release of the bolt which is in turn to be placed in the drill hole is carried out by means of a pivotable guiding means.

For these and other objects there is according to the invention provided an apparatus for moving elongated elements from a stored position to the axis of a drill hole comprising a support, guiding means in said support, a machine mechanically fed to and fro along said guiding means for driving said elongated elements into said drill hole, storage means for a plurality of elongated elements, said storage means including first and second guiding means for guiding axially spaced parts of said elongated elements, said elongated elements being sidewards slidably movable along said first guiding means, first stop means spaced from the axis of said drill hole for limiting said sidewards movement, a pivotable guiding means for guiding said elongated elements between said first stop means and said axis, and power means for pivoting said pivotable guiding means, said pivotable guiding means being in control of said first stop means.

BRIEF DESCRIPTION OF THE DRAWINGS

The above and other purposes of the invention will become obvious from the following description and from the accompanying drawings in which one embodiment of the invention is illustrated by way of example. It should be understood that this embodiment is only illustrative of the invention and that various modifications thereof may be made within the scope of the claims following hereinafter.

In the drawings.

DETAILED DESCRIPTION

Figure 1:
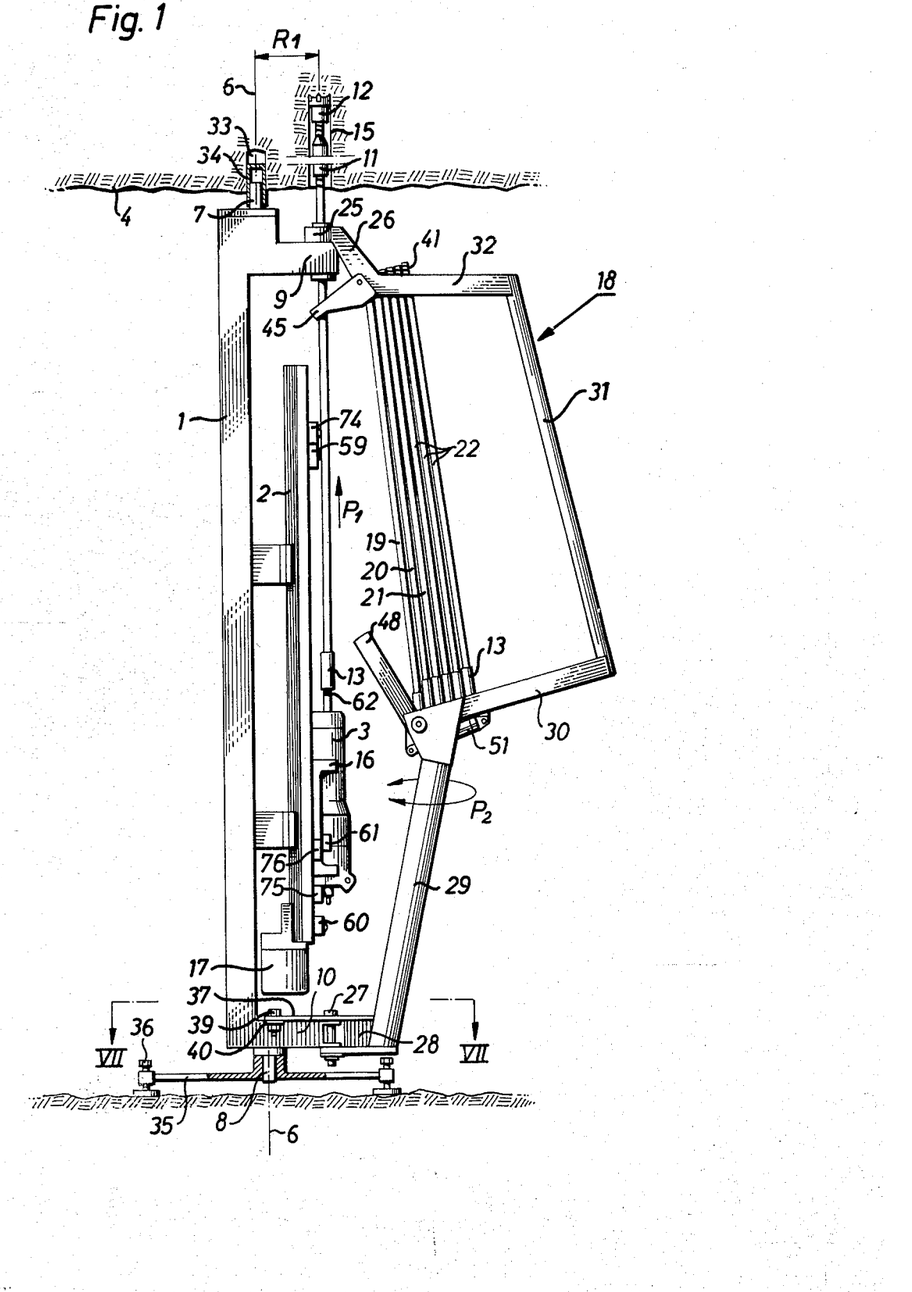
FIG. 1 shows in a side view a pneumatic rock drilling machine guided in a drill rig, which drilling machine is provided with an arrangement for automatic successive feeding and coupling extension rods according to the invention through which an automatic long-hole drilling is attained.

Apparatus for automatic long-hole drilling according to FIG. 1 comprises a drill rig 1 with a guide 2, by means of which a rock drilling machine 3 is guided in its feed direction according to the arrow $P_1$, i.e. in the drilling direction. The drill rig 1 is attached in a mine drift between the roof 4 and the floor in such a way that the drill rig 1 can be turned around a common centre axis 6 of an upper pivot 7 and a lower pivot 8 respectively, which both are firmly arranged on the drill rig 1. The drill rig 1 is provided with an upper arm 9 and a lower arm 10, the upper arm 9 being designed as a guiding for a guiding tube 11 which supports a drill bit 12 and as a guiding and locking device for a coupling sleeve 13 of an extension rod 14.

The position of the guiding for the guiding tube 11 in the arm 9 attains in co-operation with the pivots 7, 8 a radius R1 for a rim of drill holes 15, when the drill rig 1 is turned around the pivots 7, 8 and is locked with baring devices, now shown, in different positions for collaring of the drill holes 15. During the mechanical feed of the drilling machine 3 the latter is driven upwards according to the arrow $P_1$ in the guide 2 and is attached to a slide 16, which cooperates with a screw, not shown, which with a suited speed is turned round by a pneumatic motor 17.

The apparatus for long-hole drilling according to FIG. 1 furthermore comprises a magazine device, generally indicated with 18, for extension rods 19–22. The magazine device 18 is designed as a strong built yoke, which is swingably arranged respectively at the upper arm 9 and the lower arm 10 of the drill rig 1. The swingable connection to the upper arm 9 appears clearly from FIG. 5 which shows that the arm 9 is arranged with a hub sleeve 23 with a bearing member 24 for a ring 25. A part 26 of the upper member of the magazine device 18 is welded together with the ring 25.

The connection of the device 18 to the lower arm 10 on the drill rig 1 is designed as a conventional link 27 with a part 28, which is welded together with a strong tube 29. An upper part of the tube 29 is attached to the ring 25 and the part 26 welded together therewith via a supporting groove 30, a part 31 consisting of a tube with round or square profile and guiding bars 32. Said members form a stable frameunit for the device 18, which by the fact that the hinged link 27 is arranged coaxially with the ring 25, i.e. with the drill hole 15, can be turned and adjusted into different planes, which all traverse the same plane as the drilling rod 14 put into drilling position, FIG. 1. The different positions for the device 18 with respect to the drill rig 1 can be defined by the inclination of the drill rig, the space at the drilling place etc. The position of the drill rig 1 in vertical direction is then determined respectively by a pre-drilled hole 33 in the roof with a guiding sleeve 34 driven therein and a base plate 35 which rests on and is locked against the floor 5.

Figures 6, 7:
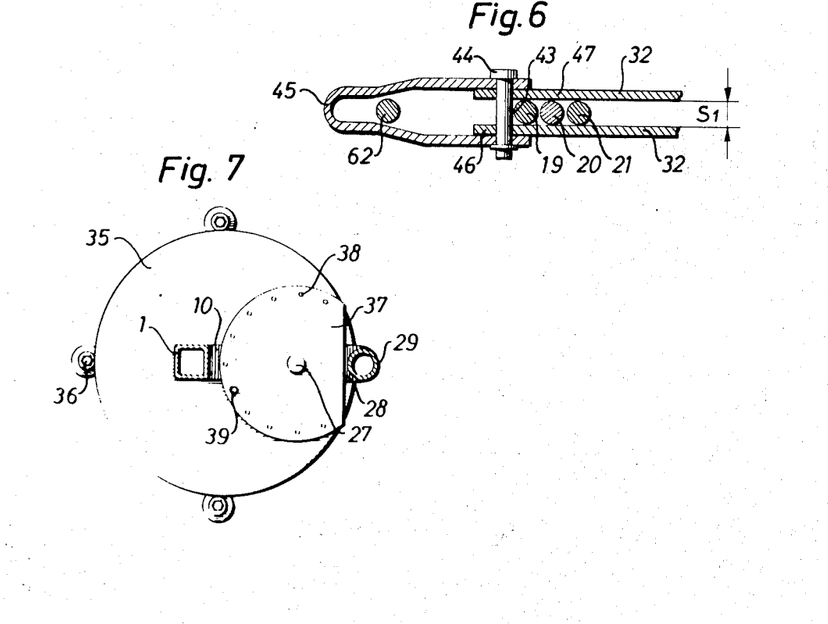
FIG. 6 is a section of the guiding device according to FIG. 5 on the line VI—VI.
FIG. 7 is a horisontal section on the line VII—VII in FIG. 1 and shows a base plate for the drill rig and a device for adjustment of the feeding device into different angular positions with respect to the drill rig.

In order to affix the device 18 in a desired plane with respect to the drill rig 1, a disk 37, as in particular is evident from FIG. 7, is arranged with holes 38 for a locking screw 39, said disk being connected to the part 28, FIG. 1. The locking screw also traverses a lug 40 attached to the lower arm 10, FIG. 1. Through this arrangement the device 18 can be turned according to the double-arrow $P_2$ within a total angular range of about 270° and can be adjusted into desired postions with respect to the drill rig 1 by pre-determined positions for the holes 38.

A number of extension rods, for instance 16 to 17 rods, can be stored in the device 18, but to gain clearness only six extension rods 19–22 are shown in FIGS. 1–4, each of the rods provided with a coupling sleeve 13. The extension rods consist of steel rods with an external special thread 41 with a coarse pitch at each end. The coupling sleeves 13 are provided with a corresponding traversing inner thread 42, FIG. 9. The threads 41, 42 are designed with a comparatively slight mutual fit so that a screwing-up operation can be done without appreciable resistance. The length of the threads 41 on the extension rods corresponds to about half the length of the coupling sleeves 13. The thread direction of the threads 40, 41 is so chosen with respect to the normal rotative direction of the rock drilling machine 3 in operation that the different members always tend to screw up when the rock drilling machine 3 operates and the drill bit 12 under rotation and actuation by impacts drills the holes 15.

As shown in FIGS. 1–4 and 8, 9 the extension rods 19–22 rest with the coupling sleeve 13 in the supporting groove 30, said coupling sleeve being previously screwed on at a lower end of each drill rod. The supporting groove 30 is arranged at the tube 29 with such an inclination that the extension rods 19–22 by their own weight gradually slide down towards a final position in the magazine, shown by the position for the extension rod 19, FIG. 1. The coupling sleeves 13 then lie close to each other, as is evident from FIGS. 8, 9.

Figure 5:
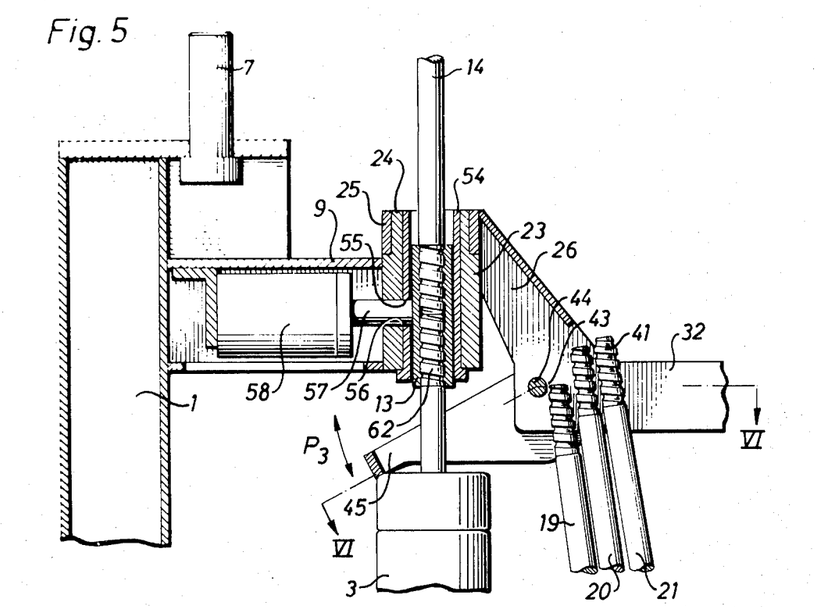
FIG. 5 shows a vertical section through an upper part of the drill rig according to FIG. 1 and an upper member of the feeding device for stored extension rods co-operating with that part and means for holding a coupling sleeve during the coupling of the additional extension rod.

The extension rod 19 lying in said final position, i.e. in a position to be fed into coupling position, rests at its upper end with an edge 43, FIG. 5, against a hardened pivot 44, which at the same time works as a suspension shaft for a guiding yoke 45 swingable according to the double-arrow $P_3$. The pivot 44 traverses the part 26, which is designed with two side walls 46, 47, FIG. 6. A distance S1, FIG. 6, between the side walls 46, 47 is a little larger than the outer diameter of the extension rods so as to the extension rods easily can move between the side walls 46, 47. The abovementioned guiding bars 32 are attached to or in one piece with the side walls 46, 47 and extend parallel with each other with the same distance S1 as the side walls 46, 47.

The pivot 44 is regarding position so oriented with respect to a stop means in connection with the supporting groove 30 that a suited inclination inwards the centre axis of the drill hole 15, i.e. against the drilling direction, will be attained. This inclination as well as the distance from said centre axis is according to the invention carefully suited so as to the extension rod to be fed into coupling position solely by its own weight and the moving pattern dependent thereon moves from a stored position to a coupling position in a way that will be made clear later on.

Figure 8:
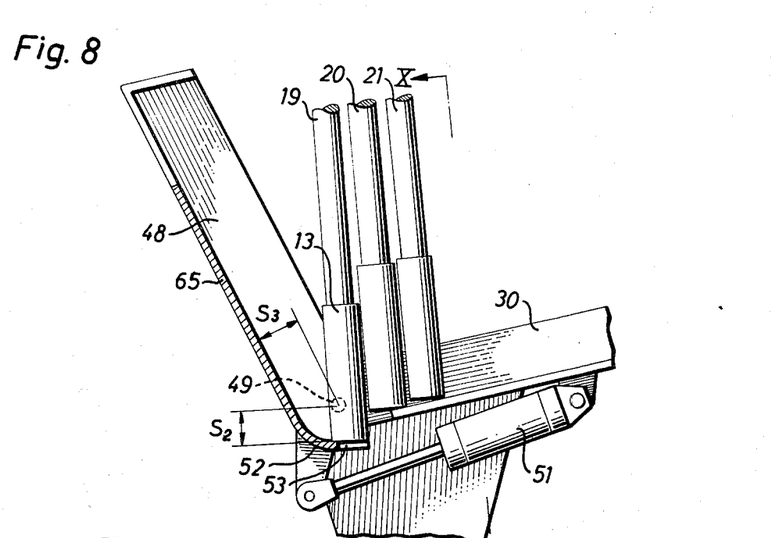
FIGS. 8 and 9 show in vertical section a lower supporting groove with a pivotable guiding groove for lower ends of the drilling rods which ends are provided with coupling sleeves, whereat the guiding groove which is actuated by means of a power cylinder is shown in two different positions in the figures respectively.
Figure 9:
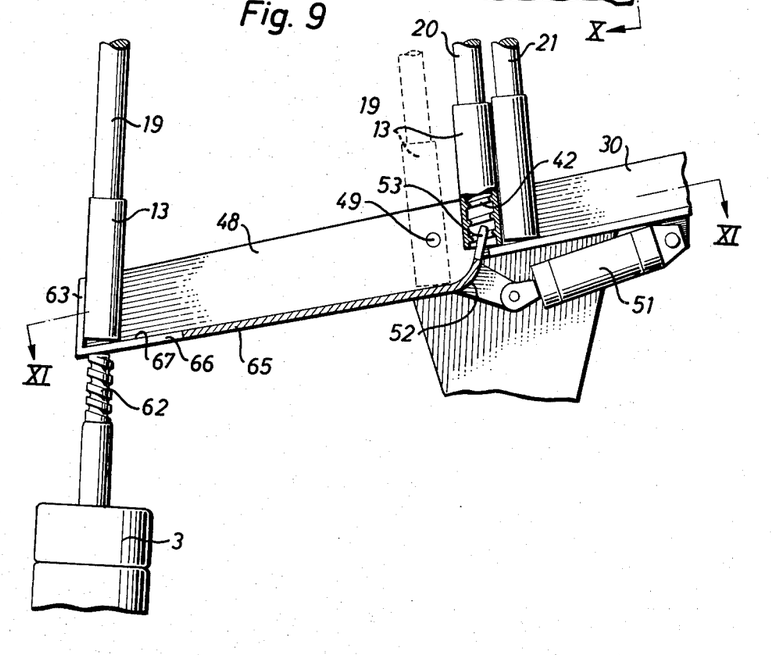
Figure 11:
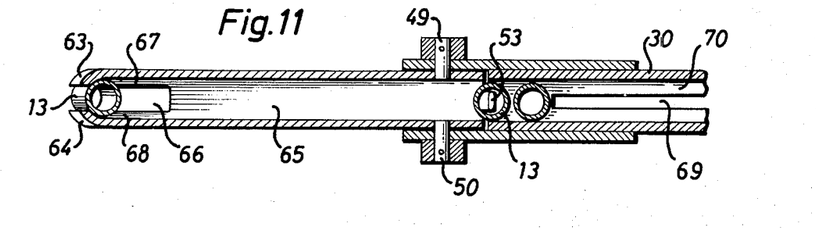
FIG. 11 is a horizontal section on the line XI—XI of the same part according to FIG. 9 with the guiding groove in a lowered position.

In connection with the supporting groove 30 is arranged a guiding groove 48, which as shown in FIGS. 8 and 9 is pivotally journalled in the plane of the supporting groove 30 by means of two pivots 49, 50 (see FIG. 11). The guiding groove 48 can be pivoted around the pivots 49, 50 from an upper position shown in FIGS. 1 and 8 to a lower position shown in FIGS. 3 and 9. The adjustment of the guiding groove 48 between these two positions is attained by a power cylinder 51. When the guiding groove 48 is in a pivoted-up position, FIGS. 1, 8 the coupling sleeve 13 of the extension rod 19 lying in position to be fed the coupling position rests against an inward curved bottom part on the guiding groove 48 and against a leaf-shaped tongue 53 projecting from that part. A distance S2 from a contact surface for the coupling sleeve 13 on the inward curved part 52 and the tongue 53 respectively to the centre line for the pivots 49, 50 is for instance 10 mm less than the distance S3 from said centre line to an inner straight bottom surface of the guiding groove 48.

This later arrangement means that, when the guiding groove by the power cylinder 51 is adjusted to the pivoted-down position according to FIG. 9, the extension rod 19 and the coupling sleeve 13 respectively by their own weight are moved by leaps downwards the distance S3–S2, where as at the same time the edge 43 on the drill rod 19, FIG. 5, is disengaged from the pivot 44. Simultaneously with the pivoting-down of the guiding groove 48, the leaf-shaped tongue 53 pushes into the nearest guiding sleeve 13 and locks the drill rod 20 so that this rod cannot move forward. These phases in the operation of the feed device 18 will be further described later on.

The hub sleeve 23 on the upper arm 9 of the drill rig 1 is, as the section according to FIG. 5 shows, provided with a guiding sleeve 54 with an inner diameter, which with a slight fit coincides with an outer diameter of the coupling sleeves 13. The guiding sleeve 54 is easily removable from the hub sleeve 23 and is locked in the latter with respect to angular position as well as height position by locking devices, not shown. In the guiding sleeve 54 as well as in the hub sleeve 23 holes 55 and 56 respectively for a piston rod 57 of a power cylinder 58, for instance an air cylinder or a thrust cylinder, are arranged, which cylinder is attached inside the upper arm 9. The power cylinder 58 with the piston rod 57 locks the coupling sleeve 13 when the latter is in the position shown in FIG. 5. To accomplish this the piston 57 is pressed against the coupling sleeve, so as to jam the coupling sleeve 13 in the guiding sleeve 54.

Figure 13:
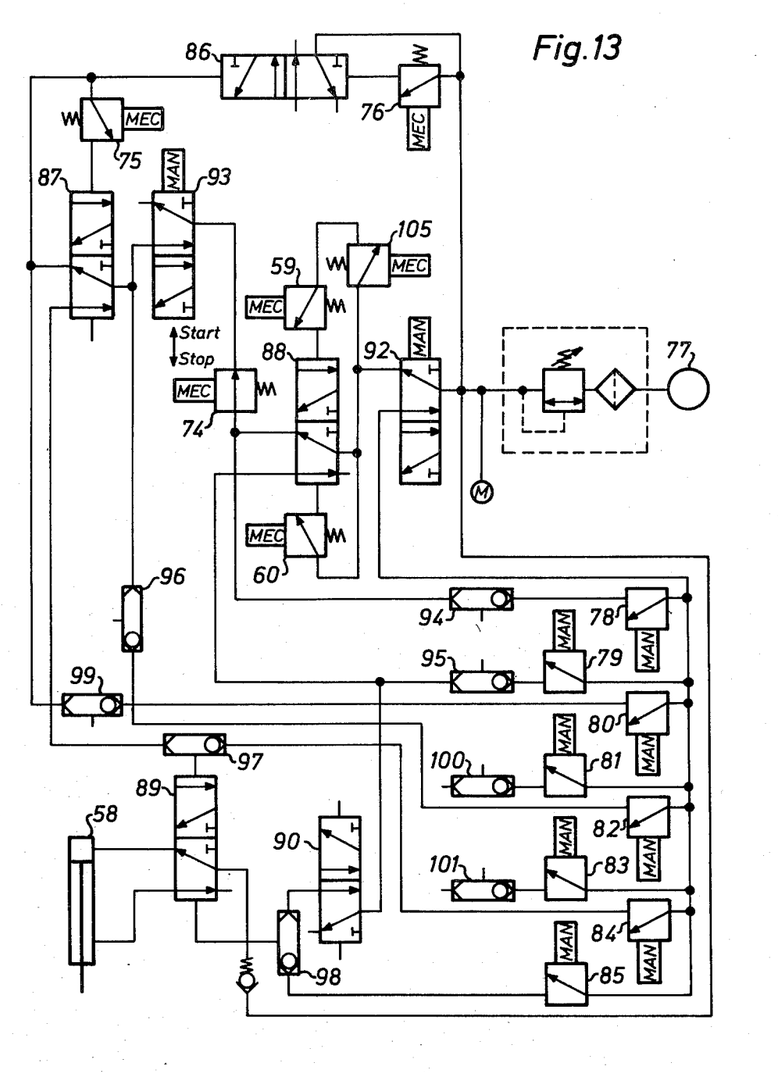
FIGS. 13 and 14 show the fundamental construction of a pneumatic circuitry for the operating of an apparatus according to the invention.
Figure 14:
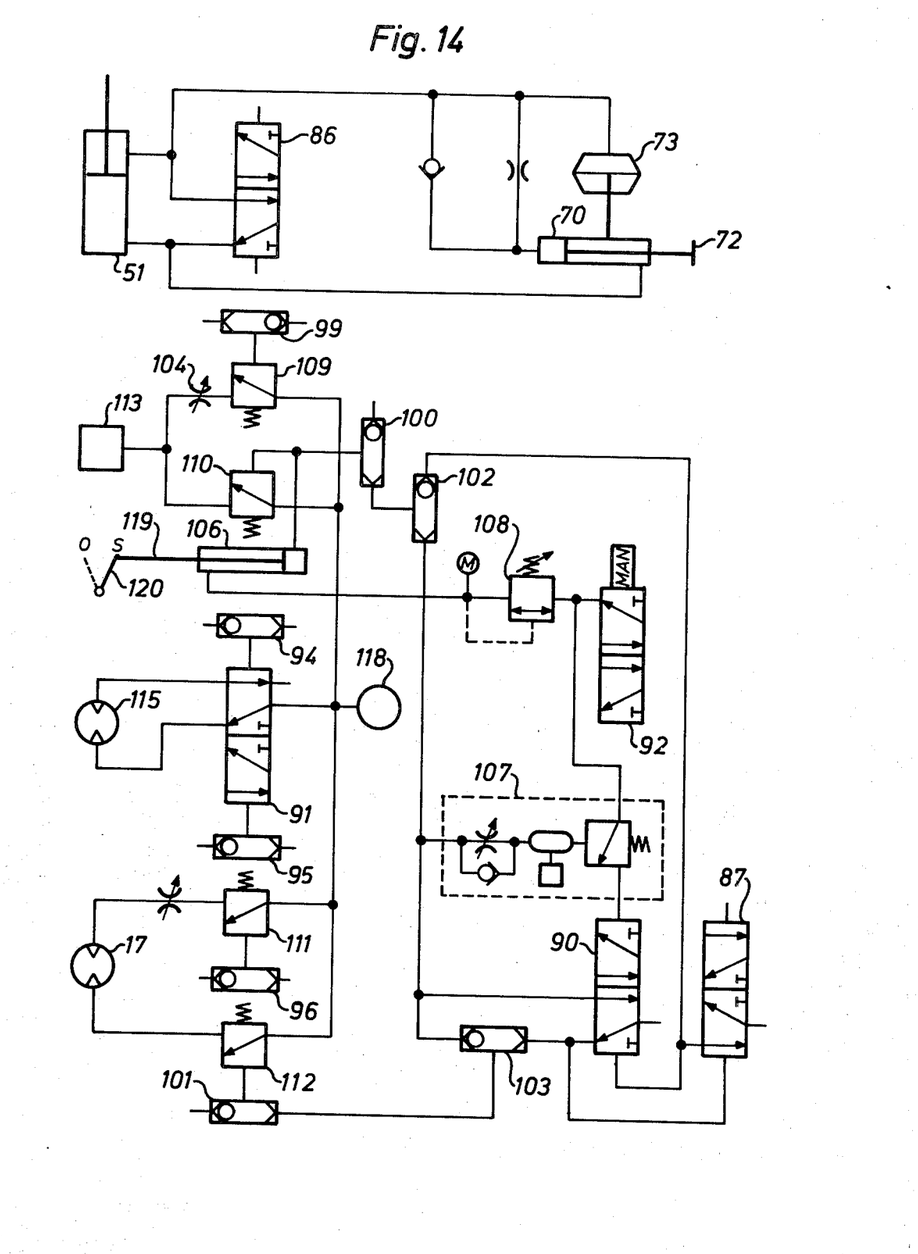

The operation of the power cylinders 51 and 58 respectively is automatically directed by a system, shown in FIGS. 13 and 14, of distributing and impulse valves connected to the ordinary pressure air net of the construction. In order to show the fundamental operation of those valves, impulse valves 59, 60, 74, 75, 76 are indicated in FIGS. 1–4, the valves being shown as arranged on the guide 2 of the drill rig for co-operating with a shoulder 61 arranged on the slide 16 of the drilling machine 3. The control system in its entirety can be arranged in a number of different ways and does not fall within the scope of the invention. The essential thing is that the different operative phases at the feeding and coupling of a drill rod are carried out consecutively and that impulses from the control system give orders in the right timing and with a suited length for the different operation phases.

In the following a description will be given step by step for a complete long-hole drilling operation with the device according to the invention. It is presumed that the drill rig has been affixed in a planned position in the mineshaft between the roof 4 and the floor, FIG. 1 and that a long-hole 15 shall be drilled under automatic feeding and coupling of drill rods. The necessary number of extension rods, beforehand calculated on the length of the prospective hole, are then placed in the device 18 according to FIG. 1. The guiding groove 48 is in a pivoted-up position and the extension rod 19 being next to the centre line of the drilling machine 3 is then placed manually in such a position that it as FIGS. 5 and 8 respectively show rests respectively with the edge 43 against the pivot 44 and against the inward curved part 52 with the tongue 53. All the other extension rods are then placed in a row after the extension rod first placed in the device 18, whereat all extension rods support against each other at their ends and lie firmly guided respectively in the supporting groove 30 and between the guiding bars 32. It is realized that the extension rods in a stored position also slightly press against each other as a result of the inclination of the supporting groove 30 and by the above described inclined position of the rods.

As a proceeding step the collaring of the drill bit 12 is prepared by removing the guiding sleeve 54 out of the hub sleeve 23, FIG. 5. The outer diameter of the guiding sleeve 54 is substantially equivalent to the outer diameter of the guiding tube 11 and the latter can therefore be pushed through the hub sleeve 23 from below, whereupon the drill bit 12, which has a little larger diameter than the guiding tube 11 can be screwed on an upper threaded end part of the guiding tube 11. The guiding tube 11 can be of the same length or a little longer than the extension rods 19–22 and shall under all circumstances be so long that, during simultaneous guiding by the hub sleeve 23 and the drilling machine 3, it gives a steady and satisfactory directing of the drill hole 15 on the one hand during the collaring, when the drill bit 12 as a result from unevenesses in the rock surface can be exposed to considerable side forces, and on the other during the first drill length which is important for the direction of the hole 15.

Then the guiding tube 11 is placed into position, and it automatically becomes centered over the shank adapter 62 of the rock drilling machine 3. The guiding tube 11 has at its lower end an inner thread, which corresponds to the inner thread 42 of the coupling sleeves 13 and when the drilling machine starts the adapter and the guiding tubes are automatically screwed together during the rotation of the adapter.

The manually controlled four-way valve 92 is so adjusted that the collaring can be made by giving impulses manually. By optional actuation of the manually controlled three-way valves 78–85 control air from the source 77 can be conducted via the valve 92, the valves 78–83 and the shuttle valves 94, 95, 99, 100, 96, 101 to the remote controlled four-way valves 109–112 and 91. By adjusting the valves 109–112 and 91 clean oiled pressure air from the source 118 can be conducted to the impact device 113, the rotation motor 115 for the adapter 62 of the rock drilling machine and the feed rotation motor 17. By actuation of the manually controlled three-way valves 84, 85 control-air from the source 77 can be conducted via the valves 84, 85 and the shuttle valves 97, 98 to the valve 89 for adjustment of the latter. Pressure air from the source 77 is then conducted via the valve 89 to one of the chambers of the cylinder 58.

The collaring can now be made by giving impulses manually and the drilling continues until the lower end of the guiding tube 11 has reached the position which approximately corresponds to the position for the coupling sleeve 13, shown in FIG. 5. By giving impulses manually to the power cylinder 58 the guiding tube is locked in that position by means of the piston 57. At the same time the impact activity of the drilling machine 3 is stopped besides which the rotative direction of the adapter 62 is reversed. The adapter 62 is then moved automatically out of the threaded end of the guiding tube 11 and the drilling machine 3 returns to a lower position in the guide 2, shown in FIG. 3.

Figure 3:
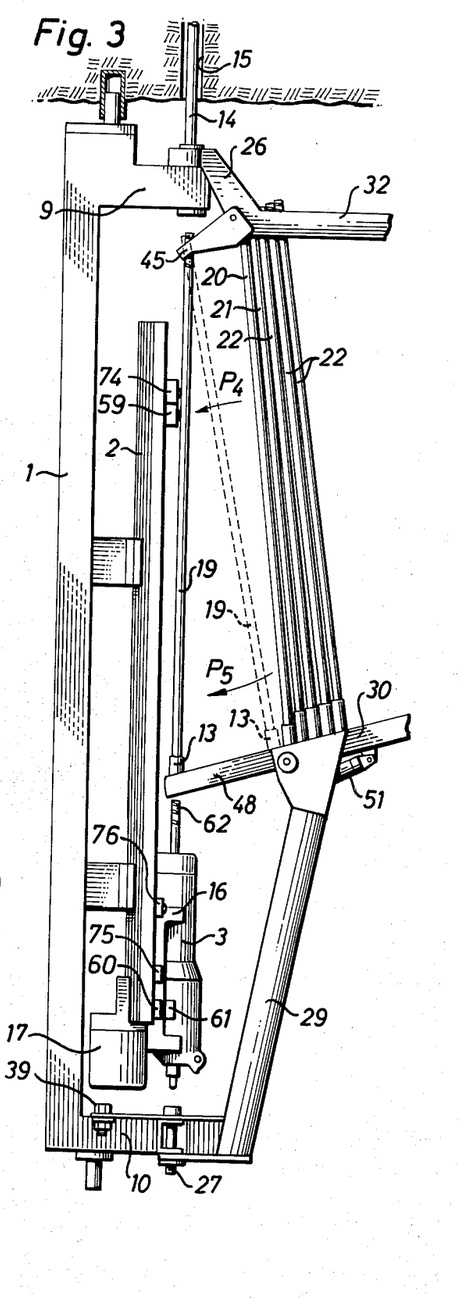

In that position for the guiding tube 11 and the drilling machine 3 an extension rod, still by manual impulses, is moved into the position shown in FIG. 3, whereat at the same time the guiding sleeve 54 which earlier has been removed is put on the extension rod whereupon the drilling machine 3 is started. The adapter 62 of the drilling machine then screws quickly into the coupling sleeve 13, after which the extension rod during the upwards movement of the drilling machine 3 with its upper end is screwed into the guiding tube 11. As soon as the guiding tube 11 during continued drilling completely has passed through the hub sleeve 23 the guiding sleeve 54 is replaced and locked in position. After those pre-operations the construction is quite ready for automatic long-hole drilling.

The valve 92 is then manually adjusted for automatic drilling and the valve 93 is manually adjusted into a starting position. FIG. 1 shows a position when the automation has been started and the extension rod 14 coupled to the guiding tube 11 according to the next preceding part of the description under rotation and actuation by impacts by the drilling machine 3 has been moved upwards according to the arrow $P_1$ a distance from the above described initial position, when the guiding tube 11 still was in the hub sleeve 23. During this operation phase the guiding groove 48 is in a pivoted-up position as shown in FIG. 1 and the guiding yoke 45 is under actuation by its own weight in a pivoted-down position in which it is locked by stopping devices, not shown.

Figure 2:
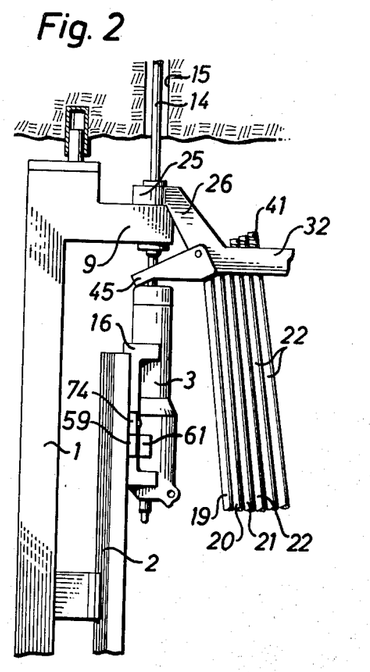
FIGS. 2, 3, and 4 show in connection with FIG. 1 different phases during the drilling and at the feeding of an additional extension rod.

When the drill bit 12 has penetrated a further distance into the rock, which distance corresponds to about the length of a drill rod the drilling machine 3 has reached an upper position according to FIG. 2. The guiding yoke 45 then is lifted a little by the drilling machine and the coupling sleeve 13 of the drill rod 14 is pushed into the guiding sleeve 54 to the position shown in FIG. 5. In this position of the drilling machine 3 the shoulder 61 on the slide 16 has reached contact with the impulse valve 59, which switches over the course to the next operation phase.

This means that the power cylinder 58, FIG. 5, is activated, and the piston rod 57 locks the coupling sleeve 13 in the guiding sleeve 54. At the same time the rotative direction of the drilling machine 3 is reversed, whereby the adapter 62 is screwed out of the locked coupling sleeve 13. The feed movement from the pneumatic motor 17 is at the same time reversed, whereby the drilling machine 3 moves down to a lower limit position, illustrated in FIG. 3, in which the shoulder 61 on the slide 16 actuates the impulse valve 60, and the next operation phase begins.

The guiding groove 48 is then pivoted by the power cylinder 51 to the pivoted-down position according to FIGS. 3 and 9. The drill rod 19 being in turn to be moved into coupling position sinks at the same time down to the position, which is shown by dashed lines in FIG. 9, whereat the edge 43 of the drill rod 19 is disengaged from the pivot 44, FIG. 5. As previously mentioned the lowering of the drill rod 19 takes place in a quick step at the pivoting of the guiding groove 48 owing to the above described length ratio between the distances S2 and S3 respectively, FIG. 8.

When the edge 43 has been disengaged from the pivot 44, FIG. 5, the extension rod 19 falls at a first moving step according to the arrow $P_4$, FIG. 3, by its own weight inwards into the guiding yoke 45 and is caught by the latter at its upper end, FIG. 3. At this a dynamic shock against the drill rod 19 arises which shock causes the lower end thereof with the coupling sleeve 13 to move in the inclined groove 48 according to the arrow $P_5$ until the extension rod 19 is in a final position, which is shown by continuous lines in FIG. 3.

This final position for the extension rod 19, which position is concentric with the centre line of the drill hole 15 is at the upper end determined by the guiding yoke 45 as previously mentioned. The position for the lower end with the coupling sleeve 13 is determined by the guiding groove 48, which has inwardly curved parts 63 at its outer end, which parts catch the coupling sleeve 13, FIG. 11. In a bottom 65 of the groove 48 is besides that arranged a recess 66 at the outer end with a width, which is slight larger than the diameter of the drill rods. The groove 48 has a width which is a little larger than the diameter of the coupling sleeve 13 and remaining edges 67, 68 of the bottom 65 on both sides of the recess 66 thus carry the extension rod 19 at the final position according to FIGS. 3, 9, and 11.

In this position the last phase automatically begins, meaning that the drilling machine 3 starts with a normal rotative direction at the same time that the feed movement upwards begins through the pneumatic motor 17. At this time in a rapid succession first the adapter 62 of the drilling machine 3 is screwed into the coupling sleeve 13, whereupon the upper threaded end of the drill rod 19 is screwed into the still locked coupling sleeve 13 of the drill rod 14, FIG. 5. As soon as this has been carried out the piston rod 57 of the power cylinder 58 is returned, whereby the coupling sleeve 13 once again is released so that drilling with the newly-added extension rod 19 can begin.

When the edge 43 on the upper end of the extension rod 19 is released from the pivot 44 all remaining extension rods fall by their own weight forward a distance which corresponds to the diameter of the extension rod. At the lower ends of the extension rods with the coupling sleeves 13 no such corresponding movement can occur owing to the previously described locking of the extension rod 20 now lying next to be fed into coupling position. This locking lasts as long as the tongue 53 remains within the coupling sleeve 13 of the drill rod 20, FIG. 9, i.e. as long as the guiding groove 48 is in a pivoted-down position.

Figure 4:
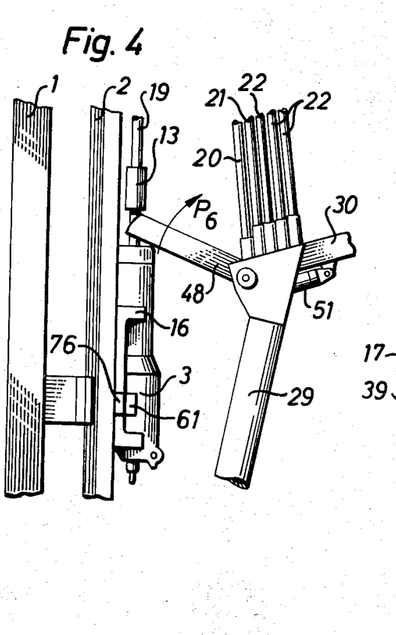

The pivoting-up of the guiding groove 48 according to the arrow $P_6$, FIG. 4, occurs at first by actuation by the drilling machine 3 during the upward movement thereof. In a position, substantially corresponding to the position according to FIG. 4, when the recess 66 completely gets clear from the coupling sleeve 13 the pivoting-up of the guiding groove 48 is taken over by the power cylinder 51 and the guiding groove is pivoted up to the final position according to FIGS. 1, 8.

Figures 10, 12:
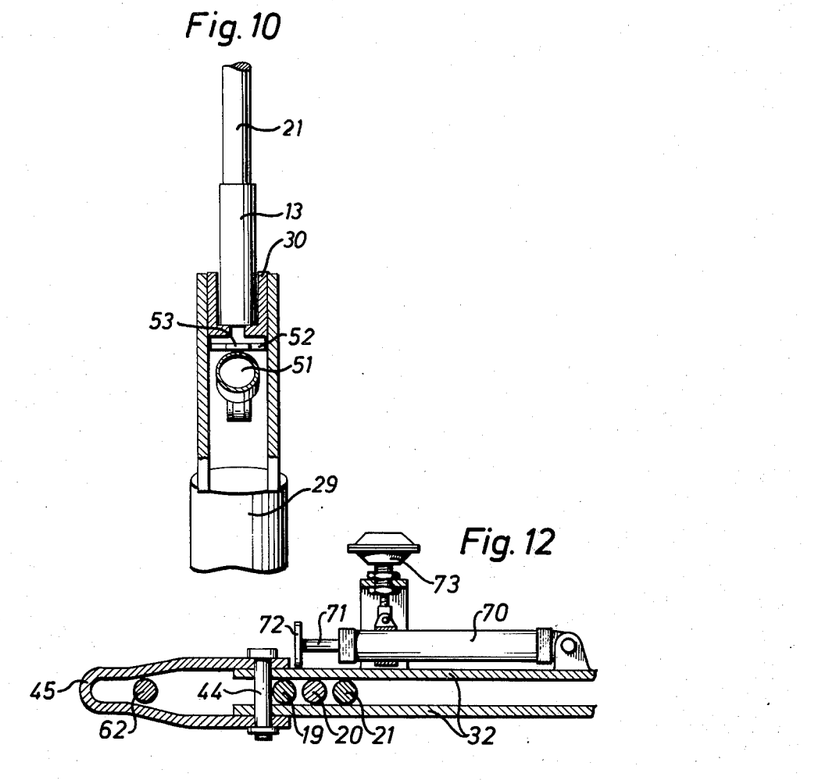
FIG. 10 is a vertical section on the line X—X of the part according to FIG. 8
FIG. 12 is a section corresponding to the section shown in FIG. 6 of a modified embodiment of the guiding device.

In FIG. 12 is shown a section of an alternative embodiment of a magazine in an apparatus according to the invention, which section corresponds to the section shown in FIG. 6. In order to prevent the upper end 62 of an extension rod moved into the guiding yoke 45 from falling backwards to the magazine a power cylinder 70 is swingably journalled at one of the guiding bars 32, beside and a little below that bar. The cylinder 70 can be swung by means of a thrust cylinder 73. A thin sheet-metal disk 72 is arranged on the piston rod 71 of the cylinder 70, which disk is brought in between the rods 19, 20 at the swinging of the cylinder 70. By extension of the piston rod 71 the disk 72 will move towards the axis of the drill hole and prevent the end 62 of the rod from falling backwards from said axis. The thrust cylinder 73 is activated simultaneously with the cylinder 51, while the cylinder 70 is activated with some time delay so that the edge 43 gets clear from the pivot 44 before the piston rod 71 is pushed forwards.

In FIGS. 13 and 14 is a pneumatic circuit shown as an example to illustrate how the above described functions can be carried out. Presume that the drilling machine 3 is in its lower limit position whereat the impulse valve 60 is actuated by the shoulder 61. The manually controlled valves 92, 93 are adjusted for automatic drilling. Control air is now conducted via the valve 92, the valve 88, the normally open valve 74 which is mechanically controlled by the shoulder 61, the valve 93 and the shuttle valve 96 to the valve 111, which valve is adjusted and oiled air from the source 118 is conducted to the motor 17, which feeds the drilling machine 3 forwards. Furthermore, control air is conducted from the source 77 via the valve 93, the valve 87 and the shuttle valve 99 to the valve 109, which is adjusted and oiled air is conducted to the impact device 113 via the restriction valve 104. From the valve 87 control air is also conducted to the valve 86, which is adjusted. Pressure air from the source 77 is now conducted via the valve 86 to the upper chamber of the cylinder 51, FIG. 14, whereat the guiding groove 48 is lowered. An extension rod can now slide along the groove 48 to the axis of the drill hole. Pressure air is also conducted via the valve 86 to the thrust cylinder 73 and the cylinder 70, which in the above described manner keeps the upper end of the extension rod concentric with the axis of the drill hole. The coupling sleeve 13 on the extension rod projecting out of the drill hole 15 is locked by the piston rod 57 of the cylinder 58. Pressure air is conducted to the upper chamber of the cylinder 58, FIG. 13, via the valve 89. Now the adapter 62 rotates, the impact device 113 delivers impacts with reduced force and the drilling machine 3 is fed forwards with reduced speed. The shank adapter 62 thus is screwed into the coupling sleeve 13 on the extension rod brought to the axis of the drill hole.

When the shank adapter 62 has been screwed into the coupling sleeve 13 the slide 16 has changed its position so that the shoulder 61 actuates the impulse valve 75, which is mounted on the guide 2. Control air is then conducted via the valve 75 to the valve 87, which is adjusted. Control air is now conducted through the valve 87 via the shuttle valves 102, 100 to the valve 110, which is opened, whereby unrestricted pressure air is conducted to the impact device 113. At the same time control air is conducted through the valve 87 via the shuttle valve 97 to the valve 89, which is adjusted. Pressure air from the source 77 is now conducted via the valve 89 to the lower chamber of the cylinder 58, FIG. 13, whereby the piston rods 57 is retracted and the coupling sleeve 13 released.

Before the valve 110, the conduit is provided with a junction which leads to a cylinder 106. The piston rod 119 of the cylinder 106 is connected to an arm 120, which opens and shuts respectively a cock for supplying flushing fluid. Pressure air is conducted to the right chamber of the cylinder 106, FIG. 14, whereby the cock is opened.

When the slide 16 has been moved a still further distance forwards, the shoulder 61 is brought into contact with the impulse valve 76, which opens and conducts control air to the valve 86, which is adjusted. At that point pressure air is conducted to the opposite chambers in the cylinders 51, 70 and the thrust cylinder 73, whereby the guiding groove 48 is pivoted up and the sheet-metal disk 72 is brought back to its initial position.

The drilling machine 3 now drills with full capacity until the shoulder 61 reaches the valve 59. The valve 59 opens and conducts control air to the valve 88, which is adjusted. Control air is now conducted through the valve 88 via the shuttle valve 95 to the valve 91, which is adjusted, whereby the rotation of motor 115 is reversed. Control air is also conducted from a junction after the valve 88 via the valve 90 and the shuttle valves 103, 101 to the valve 112, which is adjusted. The motor 17 is reversed, so that the slide 16 is moved backwards. When the magazine is empty, however, this adjustment is not carried out, because of the fact that a valve 105, which senses the existence of extension rods in the magazine, is not actuated and therefore does not let through control air to the valves 59, 88. The slide 16 then continues upwards a distance until the shoulder 61 is brought into contact with a normally open impulse valve 74, whereby the pressure air supply to the valve 93 is shut off and the drilling machine 3 stops.

Control air is also conducted from the valve 90 via the shuttle valve 98 to the valve 89, which is adjusted, whereby pressure air is conducted to the upper chamber of the cylinder 58, FIG. 13, and the piston rod 57 thus locks the coupling sleeve 13. Control air is also conducted from the valve 90 to a delay valve 107.

Control air from the valve 90 is conducted via the shuttle valves 102, 100 to the valve 110, which opens and conducts pressure air to the impact device 113. The shank adapter 62 is now screwed out of the coupling sleeve locked by the piston rod 57 at the same time as the motor 17 moves the slide 16 backwards.

After about 15 sec. the delay valve 107 opens and conducts control air from the valve 92 to the valve 90, which is adjusted. Furthermore pressure air is now conducted through the pressure regulator 108 to the cylinder 106, which shuts off the flushing.

When the valve 90 is adjusted control air is conducted via the shuttle valves 103, 101 to the valve 112, which remains open and conducts unrestricted pressure air to the motor 17. The drilling machine 3 is now brought backwards to its rear limit position.

When the drilling machine 3 has reached its rear limit position the shoulder 61 actuates the impulse valve 60 and starts a new cycle by lowering the guiding groove 48, whereby a new extension rod is fed into coupling position.

The described feed and coupling process respectively is automatically repeated for each extension rod and continues without external intervention until the last stored extension rod has been driven up into the drill hole 15 and its coupling sleeve 13 automatically, in the described manner, has been locked in the guiding sleeve 54, FIG. 5. The projected long-hole is then drilled and the drilling device is completely stopped by the impulse valve 74.

The withdrawing of the extension rods and the guiding tube with the drill bit is carried out by manual operation of the device, the pneumatic motor 17 then being used for successive lowering of the string of extension rods in the drill hole 15. When an extension rod has been lowered to the initial coupling position the coupling sleeve of the next above lying extension rod is locked in the hub sleeve 23 by the power cylinder 58, FIG. 5. The extension rod brought down is then manually screwed out by means of a simple tool and once again placed in a stored position according to FIG. 1. At this point it is to be observed that the extension rods, regarding the use thereof, will be subject to a cyclic course so that all extension rods will be equally used at a succession of long-hole drillings. This is very important since the extension rods are subjected to severe wear and because of the fact that all extension rods at a long-hole drilling should be in about the same condition.

The pneumatic means for controlling the different phases during the long-hole drilling can as previously mentioned be of conventional type with robust and reliably operating valve means.

Through the described device considerable advantages compared to known techniques will be obtained. The manual operations can be limited to the described pre-work at the insert of the guiding tube and the extension rod 14 and the withdrawing of the extension rods and the placing of the latter in a stored position. The drilling itself becomes quite automatic. The drilling device can be completely left without superintendence during the very drilling and the machine operator can devote himself to other working tasks in the mine shaft outside the inhospitable milieu next to the drilling machine. The improvements regarding the working conditions as well as the economical profits are obvious.

Moreover, the device according to the invention will be simple in construction and consequently also easy to handle. The manufacturing costs are also low and the investments become small compared to the rationalization profits which are attained.

Variations are possible within the scope of the invention regarding the design on the whole as well as with respect to details. The magazine device has in the description and drawings been shown substantially as a construction of welded profiled tubes and sheet-metal, which gives a simple, stable and inexpensive design. But it is obvious that the construction also can be built as a frame structure in solely sheet-metal.

Also regarding the details are modifications possible, for instance with respect to the supporting groove 30, the guiding groove 48 and the guiding yoke 45. The supporting groove 30 is in FIG. 11 provided with a slot 69, which is arranged in a bottom 70 of the groove 30. The slot 69 serves as an outflow opening for the water and the drill dust, which can flow down into the groove 30 during the drilling operation.

The description and drawings have been based on a long-hole drilling operation carried out substantially vertically. The drill rig 1 and the device 18 have for that reason been shown arranged vertically. With the described device it is also possible to carry out inclined or horizontal long-hole drilling by a slight modification of the means operating in connection with the feed of the extension rod.

When the invention is applied to roof bolting it is also possible to put bolts into drill holes with different inclination. Further the bolts can be turned upside down in the magazine for bolting of the floor.

What we claim is:

1. Apparatus for moving elongated elements from a stored position to the axis of a drill hole comprising:
   a support,
   guiding means in said support,
   a machine mechanically fed to and fro along said guiding means for driving said elongated elements into said drill hole,
   storage means for a plurality of elongated elements, said storage means including:
   first and second guiding means for guiding axially spaced parts of said elongated elements, said elongated elements being sidewards slidably movable along said first guiding means,
   first stops means spaced from the axis of said drill hole for limiting said sidewards movement, a pivotable guiding means for guiding said elongated elements between said first stop means and said axis of said drill hole, and drive means for pivoting said pivotable guiding means, said pivotable guiding means controlling said first stop means.

2. Apparatus according to claim 1 in which said elongated members are sidewards slidably movable along said second guiding means, and said storage means further includes: second stop means spaced from the axis of said drill hole for limiting the sidewards movement of said elongated elements along said second guiding means, and a guiding yoke for guiding said elements between said second stop means and said axis, said pivotable guiding means controlling said second stop means.

3. Apparatus according to claim 1 in which said first guiding means comprises: means forming a first guiding groove inclined towards the axis of the drill hole and said pivotable guiding means is pivotable relative to said first guiding means and is pivotable between up and down positions, said pivotable guiding means comprising means forming a second guiding groove substantially in straight alignment with said first groove when said pivotable guiding means is in an extreme pivoted-down position for guiding said elongated elements between said first stop means and said axis so as to allow the elongated elements in said grooves to tend to slide towards said axis by their own weight.

4. Apparatus according to claim 2, in which said guiding yoke is provided with a further stop means for adjusting the upper end of an elongated element moved into said yoke into alignment with said axis.

5. Apparatus according to claim 3, in which said second groove means is provided with inwardly curved parts at its outer end, said parts forming a stop for the lower end of one of said elongated elements when another one is in a position co-axial with said axis.

6. Apparatus according to claim 3, in which said second groove means is pivotally connected to said first groove means by means of pivots and the inner end of said second groove means is provided with an upwardly bent part.

7. Apparatus according to claim 6, in which the distance between said upwardly bent part and said pivots is less than the distance between said pivots and the bottom of said second groove.

8. Apparatus according to claim 6, in which said first stop means includes a tongue projecting from said upwardly bent part, said tongue being a little narrower than an inner diameter of the lower end of one of said elongated elements, said tongue extending a distance into said lower end when said second groove means is in its extreme pivoted-down position for providing said first stop means.

9. Apparatus according to claim 1, in which said storage means comprises a frame structure, and first and second bearing points arranged respectively at a first and a second end part of said support, said frame structure being swingable around said bearing points, the axis of said first and second bearing point being coaxial with said drill hole, said second guiding means comprising two parallel bars, and in which said first and second groove, said guiding yoke and said bars are arranged in the same plane with the distance between said first groove and said bars being substantially equivalent to the length of said elongated elements.

10. Apparatus according to claim 9, in which said guiding yoke is pivotally journalled on a pivot, said pivot traverses an inner end part of said guiding bars, the distance between said pivot and said upwardly bent part with said tongue in the extreme pivoted-up position of said second groove is a little smaller than the length of said elongated elements, and the distance between said pivot and the bottom of said second groove in the extreme pivoted-down position of said second groove is a little larger than the length of said elongated elements.

11. Apparatus according to claim 2, in which said drive means includes a power cylinder swingably mounted beside said second guiding means, power means for swinging said power cylinder, means on the outer end of the piston rod of said power cylinder movable from a position adjacent said second stop means into and along respectively the path of said elongated elements at respectively the swinging and extension of said power cylinder for providing a stop for the upper ends of said elongated elements, when the latter are located in the axis of the drill hole.

12. Apparatus according to claim 9, in which said frame structure comprises in combination a lower part which forms a movable member of a hinged link, a first frame element preferably comprising a profiled tube, said first guiding groove, a second frame element preferably comprising a profiled tube, said guiding bars and an upper part with a bearing ring, said bearing ring and said hinged link forming respectively a movable part of said first bearing point and said second bearing point for said swingable frame structure.

13. Apparatus according to claim 12, in which said elongated elements are extension rods, coupling sleeves are screwed on the lower end of said rods, said first bearing point further comprises a hub sleeve, said hub sleeve via an upper arm being firmly attached to said support, and a guiding sleeve, said guiding sleeve being removably arranged in said hub sleeve and having an inner diameter which is substantially equivalent to the outer diameter of said coupling sleeves.

14. Apparatus according to claim 13, in which temporary locking means is provided in connection to said upper arm for temporary locking a coupling sleeve moved into said guiding sleeve.

15. Apparatus according to claim 14, in which said temporary locking means comprises power means attached in said upper arm, said power means has a piston rod, said piston rod traverses on the one hand a hole arranged in said hub sleeve and on the other a corresponding hole arranged in said guiding sleeve and with an outer end presses against said coupling sleeve to lock it in said guiding sleeve.

16. Apparatus according to claim 9, in which said frame structure is provided with locking means for locking the swinging thereof, and said means preferably is arranged to cooperate with the lower part of said frame structure.

17. Apparatus according to claim 16, in which said locking means comprises a disk attached to said lower part, circular arranged holes in said disk, a lug on said support and at least one locking screw for affixing said disk against said support by said lug.

18. Apparatus according to claim 11, in which means are provided for automatically adjusting said pivotable guiding means from said extreme pivoted-up to said extreme pivoted-down position by said power means.

19. Apparatus according to claim 18, comprising a pressure-fluid system including valve means, said valve means being arranged axially spaced on said guiding means for said machine, means on said machine for actuating said valve means at the passing thereof, and said power means being coupled to and actuated by said valve means for consecutively and automatically feeding said elongated elements from said storage means.

20. Apparatus according to claim 10, in which said drive means includes a power cylinder swingably mounted beside said second guiding means, power means for swinging said power cylinder, means on the outer end of the piston rod of said power cylinder movable from a position adjacent said second stop means into and along respectively the path of said elongated elements at respectively the swinging and extension of said power cylinder for providing a stop for the upper end of said elongated elements, when the latter are located in the axis of the drill hole.

21. Apparatus according to claim 3 in which means are provided for automatically adjusting said pivotable guiding means from said extreme pivoted-up to said extreme pivoted-down position.

22. Apparatus according to claim 21, comprising a pressure-fluid system including valve means, said valve means being arranged axially spaced on said guiding means for said machine, means on said machine for actuating said valve means at the passing thereof, and said power means being coupled to and actuated by said valve means for consecutively and automatically feeding said elongated elements from said storage means.

23. Apparatus according to claim 1, in which means are provided for automatically adjusting said pivotable guiding means from an extreme pivoted-up to an extreme pivoted-down position.

* * * * *